United States Patent Office 3,501,494
Patented Mar. 17, 1970

3,501,494
CYCLOPENTANETETRACARBOXYLIC ACID DIIMIDES
David P. Hansell, Tonbridge, and Barry D. Jones, Worthing, England, assignors to Bridge Chemicals Limited, Welwyn Garden City, Hertfordshire, England, a British company
No Drawing. Filed July 6, 1966, Ser. No. 563,083
Claims priority, application Great Britain, July 13, 1965, 29,743/65
Int. Cl. C07d *27/08*
U.S. Cl. 260—326.3        1 Claim

ABSTRACT OF THE DISCLOSURE

N,N' - disubstituted - 1,2,3,4 - cyclopentanetetracarboxylic acid diimides are prepared from the corresponding tetra-amides by heating. The diimides are useful as intermediates, gasoline additives, polymer stabilizers, and fungicides. A specific compound disclosed in bis-N,N'-(trichloromethylthio) - 1,2,3,4 - cyclopentanetetracarboxylic acid diimide.

---

This invention relates to diimide derivatives of cyclopentanetetracarboxylic acid.

In particular the invention is concerned with the diimide of 1,2,3,4-cyclopentanetetracarboxylic acid and the N,N'-disubstituted derivatives thereof, which diimide has the structural formula:

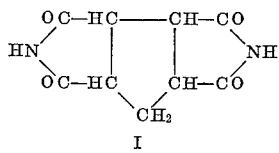

I

It will be appreciated that 1,2,3,4-cyclopentanetetracarboxylic acid (which can be abbreviated to CPTCA) can have six possible geometric configurations which may be referred to as the cccc (or all-cis), ctcc, cttc, cctt, tccc and ctct forms (where c stands for cis and t stands for trans), of which all except the cccc and cttc forms may be resolved into optical isomers. The corresponding diimides of all these possible configurations are included within the scope of the present invention although the preferred diimide is that derived from the so-called all-cis form.

The diimide of Formula I may be prepared by heating the corresponding tetra-amide at an elevated temperature in an inert atmosphere. Alternatively the substituted or unsubstituted diimides may be obtained by heating in vacuo the corresponding 1,3-diamide 2,4-diammonium salt of CPTCA.

The tetra-amide and the amide ammonium salts of CPTCA used as starting materials in this invention form part of the subject matter of our copending application, Ser. No. 491,019 filed Sept. 28, 1965.

Included in this invention are N-substituted derivatives of the compounds of Formula I, such as those which are known and prepared in the phthalimide or succinimide series, see for example, Brewster, Organic Chemistry, pages 665, 666, 413, 323, 335 and 786; Richter's Organic Chemistry, I, pages 552–554, III page 386; Whitmore Organic Chemistry, pages 827, 187, 459, 501, 881. Exemplary of such compounds which are included in this invention are those of the following structural formula:

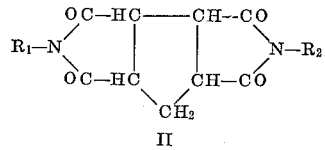

II in which $R_1$ and $R_2$ are hydrogen, halo such as bromo or chloro, alkyl such as alkanyl or alkenyl of from 1–18 carbon atoms, benzyl, cycloalkyl such as cyclohexyl or cyclopentyl, alkali metal such as potassium and sodium, phenyl, substituted alkyl, i.e., hydroxyalkyl such as hydroxymethyl, ethyl or propyl, or chloro or bromomethyl, ethyl or propyl, or trihalomethylthio such as trichloromethylthio.

These compounds are prepared by methods described in the cited references or in the description above. The mono or disubstituted amide ammonium salt of the copending application may be cyclized to the diimide by heating at elevated temperatures. Alternatively the parent diimide of Formula I may be reacted at one or both reactive centers either directly as with bromine or chlorine to form the N-bromo or N-chloro derivatives or with alkali to form the N-sodio or N-potassio derivatives. These intermediates are then reacted further, for example the alkali salts with an alkyl halide to form the N-alkyl derivatives as described in the prior art. Alternatively, the parent diimide of CPTCA can be heated at reflux with the desired halide and sodium carbonate in alcohol.

The compounds of this invention have uses as intermediates as well as industrial chemicals. For example the diimide parent as well as its N-alkyl or N-aryl substituted congeners can be used as organic intermediates, stabilizers for polyurethane prepolymers and as gasoline additives. The N-halo diimides are useful as intermediates as well as fungicides, insecticides and germicides. The N-trihalomethylthio diimides are also useful as fungicides, insecticides and germicides.

EXAMPLE 1

The tetramethyl ester of all-cis CPTCA (6.02 g.) is dissolved in liquid ammonia (100 ml.) and sealed in an autoclave at room temperature for 48 hours. The resulting solid product is washed with methanol and filtered to give the tetra-amide of all-cis CPTCA.

The tetra-amide of all-cis CPTCA (5.0 g.) is heated at 180–200° C. under nitrogen for five hours and then cooled. Dioxan (25 ml.) is added and the resulting mixture is heated to reflux and then filtered. The dioxan solution so obtained is evaporated to dryness to give the diimide of all-cis CPTCA, M.P. 282–285° C.

EXAMPLE 2

The 1,3-diamide 2,4-diammonium salt of CPTCA (5.0 g.) is heated in vacuo at 200° C. for seven hours and then cooled. Dioxan (25 ml.) is added. The resulting mixture is heated to reflux and then filtered. The dioxan solution so obtained is evaporated to dryness to give the diimide of all-cis CPTCA identical with that of Example 1.

The same reaction is run with the di-N-cyclohexyl amide of CPTCA as the 2,4-diammonium salt to give the di-N-cyclohexyl diimide of CPTCA.

Di-N-phenylamide salt of CPTCA prepared as the N-cyclohexyl derivative above but using aniline instead of cyclohexylamine, is heated in vacuo at 250° C. for ten hours. Working up as described gives the di-N-phenyl diimide.

Using the monocyclohexylamine triamine salt gives the N-cyclohexyl diimide.

EXAMPLE 3

Diimide of all-cis CPTCA (1.04 g.) is mixed with trimethylamine (0.3 g.) and dioxan (8 ml.). A solution of trichloromethane sulphenylchloride (1.86 g.) in chloroform (2 ml.) is then added below 40° C. The resulting solid is filtered off, washed with acetone (10 ml.), cooled and filtered. Water is added to the acetone solution to the point of oil formation, following which the resulting mixture is cooled with vigorous shaking and filtered. Recrystallization from benzene gives N,N'-bis (trichloromethylthio) all-cis 1,2,3,4 - cyclopentanetetracarboxylic acid diimide, M.P. 215–219° C.

EXAMPLE 4

Diimide of all-cis CPTCA (0.52 g.) is suspended in water and chlorine gas bubbled slowly through for ten minutes. The resulting solid is filtered and dried in vacuo to give N,N'-dichloro all-cis 1,2,3,4-cyclopentanetetracarboxylic acid diimide, M.P. 198–201° C.

Using bromine gives the N-bromo derivative.

EXAMPLE 5

The diimide of CPTCA (52 g.) is treated with a slight excess of potassium hydroxide in ethanol to give the di-N-potassio derivative of the CPTCA imide. The sodio derivative is also easily prepared using sodium carbonate. The potassio compound (2.5 g.) is treated with stoichiometric quantities of an alkyl halide in dioxane or alcohol at reflux to give the N-substituted derivatives. In this way ethyl chloride gives the N-ethyldiimide of CPTCA, benzyl chloride gives the di-N-benzyldiimide, ethylchlorohydrin gives the di-N-hydroxyethyldiimide, allyl chloride gives the di-N-allyldiimide, methallyl chloride gives the di-n-methallyldiimide, isooctyl bromide gives the N-isooctyldiimide, hexadecyl chloride gives the di-N-hexadecyldiimide.

The diimide (1 g.) is reacted with an excess of formaldehyde at 100° C. to give the di-N-hydroxymethyldiimide of CATCA.

What is claimed is:

1. N,N'-bis (trichloromethylthio) all-cis 1,2,3,4-cyclopentanetetracarboxylic acid diimide.

References Cited

UNITED STATES PATENTS 3,297,714   1/1967   Van Volkenburgh __ 260—326.3

ALEX MAZEL, Primary Examiner

R. V. RUSH, Assistant Examiner

U.S. Cl. X.R.

44—63; 260—45.8, 999